(12) United States Patent
Tsongas et al.

(10) Patent No.: US 8,713,372 B2
(45) Date of Patent: Apr. 29, 2014

(54) METHOD AND SYSTEM FOR UPDATING DEVICE MANAGEMENT APPLICATION METER READ LOGIC

(75) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 432 days.

(21) Appl. No.: 13/077,001

(22) Filed: Mar. 31, 2011

(65) Prior Publication Data
US 2012/0254661 A1 Oct. 4, 2012

(51) Int. Cl.
*G06F 11/00* (2006.01)

(52) U.S. Cl.
USPC .......................................................... 714/32

(58) Field of Classification Search
USPC ............................................ 714/32; 709/224
See application file for complete search history.

(56) References Cited

U.S. PATENT DOCUMENTS

| | | | |
|---|---|---|---|
| 5,907,696 A * | 5/1999 | Stilwell et al. ................. | 703/13 |
| 6,947,964 B2 | 9/2005 | Nishio | |
| 6,981,036 B1 | 12/2005 | Hamada | |
| 7,146,112 B2 | 12/2006 | Phipps et al. | |
| 7,237,771 B2 | 7/2007 | Lang et al. | |
| 7,529,491 B2 | 5/2009 | Rommelmann et al. | |
| 7,574,489 B2 | 8/2009 | Motoyama et al. | |
| 7,580,936 B2 | 8/2009 | Salgado | |
| 7,644,145 B2 | 1/2010 | Rockwell | |
| 7,726,556 B2 | 6/2010 | Beabes et al. | |
| 8,144,354 B2 * | 3/2012 | Scaff ............................ | 358/1.15 |
| 8,446,626 B2 * | 5/2013 | Yamaguchi ................... | 358/1.15 |
| 2002/0087470 A1 | 7/2002 | Hayes et al. | |
| 2002/0196463 A1 | 12/2002 | Schlonski et al. | |
| 2003/0038958 A1 | 2/2003 | Salgado et al. | |
| 2003/0126302 A1 * | 7/2003 | Bower, III ..................... | 709/310 |
| 2005/0052660 A1 * | 3/2005 | Sabbagh et al. ............... | 358/1.1 |
| 2006/0178917 A1 | 8/2006 | Merriam et al. | |
| 2007/0234354 A1 * | 10/2007 | Hattori .......................... | 717/177 |
| 2007/0242303 A1 * | 10/2007 | Barry et al. ................... | 358/1.15 |
| 2011/0213848 A1 * | 9/2011 | Gilmour ........................ | 709/206 |

* cited by examiner

*Primary Examiner* — Yair Leibovich
(74) *Attorney, Agent, or Firm* — Ronald E. Prass, Jr.; Prass LLP (57) ABSTRACT

The disclosure relates to a computerized method and system for automatically updating a device management application with meter retrieval logic that is customized to the device mix in a managed environment. The management application would interrogate the environment and make intelligent decisions on what meter logic to implement. The management application would self adapt and retrieve the correct meter logic as the environment changes. This adaptation is not tied to product names or other identification methods, rather using rules associated with queries and responses the meter read logic is altered to the device mix. The method would first try submitting small test jobs and seeing if the known meter read logics produced the correct meter increment. If this does not confirm, the system then interprets the query of the private portion of the MIB or the web server to determine where the correct increment is located.

19 Claims, 8 Drawing Sheets

PARAMETER LIST

METER DESCRIPTION LOGIC

420 { P1, P2, P3, P4, P5, P6, P7, P8, ..., Pn

METER DESCRIPTION 1

M1=M1+ P5
M2=M2 + (P3*P5)
M3=M3 + P6 + P7(20>Cnt)
.
.
Mn=F(M1,P1..Pn)

METER DESCRIPTION 2

METHOD AND SYSTEM FOR UPDATING DEVICE MANAGEMENT APPLICATION METER READ LOGIC

BACKGROUND

This disclosure relates in general to identifying and extending the meter read logic for a specified device that is connected to a computer network. More specifically, the invention relates to a computerized method and system for device management applications to be automatically updated with meter retrieval logic which self customizes to the individual device in a managed environment.

Various types of devices, such as, for example, printers or copiers, can include a mechanism for computing amount of usage. The mechanism for computing the amount of usage can be a meter, and the amount of usage can be defined in terms of a meter count. The amount of usage (meter count) of such a device can be relevant to a business agreement between contracting parties. Such a business agreement can define the responsibilities of a customer (user, purchaser or lessee of the device) and a billing service (manufacturer, seller or lessor of the device). The business agreement can be a lease agreement or a purchase agreement for the device that includes billing periods for which the customer is required to make payments, and stipulated costs covering a predetermined amount of usage within a billing period. The predetermined amount of usage within a billing period can be referred to as a meter allowance. The agreement can provide that if the customer exceeds the meter allowance, then the customer is billed for the amount of usage (meter count) that exceeds the meter allowance. In this case, the customer would only be billed for the difference between the amount of usage (meter count) and the meter allowance. Alternatively, the agreement can provide a stipulated cost per use (count) of the device. In this case, the customer would only be billed for the amount of usage (meter count) within the billing period.

Billing information is generally acquired by sensing some machine occurrence, such as support material feeding or the like, and sending this information to a storage device in the machine or directly to a billing meter system via a network. As such, the billing system was only capable of identifying and recording one billing scheme. Furthermore, when a machine malfunction occurred and a copy run had to be temporarily interrupted, the original count was generally lost and, as a consequence, erroneous billing information was recorded upon the re-institution of the run.

It has been found in practice that the billing rates charged to customers by most machine suppliers will change from time to time during the lifetime of a machine. Some products can serve several markets. However, because of different market pressures in the several markets, the machines must be configured to bill differently in each of the several markets. Changes in billing rates necessitate a reorientation of the billing meters which, in the hard wired system, involves a relatively long machine down time or, in extreme cases, even recalling the machine from the field. This, of course, inconveniences the customer and results in considerable cost to the supplier. Where billing software is "hard coded" into the image processor, adapting machines to these various markets is problematic. Each software version must be written, tested and maintained separately. On the other hand, if a problem is discovered in one version, all the other versions must be checked in order to determine if the problem is common to all versions or limited to only one version. In short, hard coded billing software is expensive and inflexible.

Another obstacle encounter in the setting and gathering of billing rates is brought about by the product mix and by the disparate standards to data storage introduced by manufacturers. Currently a device management application retrieve meters based on a predefined set of logic that is tied to product names or other outward identification methods. Updates to this logic require installation of an updated management application. There is one update which is tailored to loosely fit all installations and does not allow for device differences in customer environments.

For the reasons stated above, and for other reasons stated below which will become apparent to those skilled in the art upon reading and understanding the present specification, there is a need in the art to provide the very latest meter read logic to existing and new devices without human intervention.

SUMMARY

The disclosure relates to a computerized method and system for automatically updating a device management application with meter retrieval logic that is customized to the device mix in a managed environment. The management application would interrogate the environment and make intelligent decisions on what meter logic to implement. The management application would self adapt and retrieve the correct meter logic as the environment changes. This adaptation is not tied to product names or other identification methods, rather using rules associated with queries and responses the meter read logic is altered to the device mix. The method would first try submitting small test jobs and seeing if the known meter read logics produced the correct meter increment. If this does not confirm, the system then interprets the query of the private portion of the MIB or the web server to determine where the correct increment is located.

DETAILED DESCRIPTION

Aspects of the embodiments disclosed herein relate to methods to enable device management applications to pull updated meter read logic from a hosted repository. Once pulled, the correct logic would be applied to the management application based on a self analysis of the mix of products in the individual environment. An aptly programmed device manger would continually use the best method defined by the latest meter read logic based on its own queries of device data. The management application would interrogate the environment and make intelligent decisions on what meter logic to implement. As the environment changes, the management application would self adapt and retrieve the correct meter logic. This would not be tied to product names or other identification methods, rather using logic in the software the meter read algorithms would be altered based on device queries and responses. The automated method would first try a set of known meter read methods by submitting small test jobs and seeing if the known method produced the correct meter increment. If this does not confirm, the system then interprets the query of the private portion of the management information base (MIB) or the web server to determine where the correct increment is located. Once a candidate location is identified, a confirmation test job is submitted and the MIB location for meter reads is verified.

In another aspect, the disclosed embodiment is to a method to identify meter read logic for monitored devices comprising querying a monitored device to ascertain information from a management information block at the monitored device; analyzing the ascertained information to identify a likely meter read logic for the monitored device; and implementing at a monitoring device the identified likely meter read logic to extract information from the management information block at the monitored device.

In still another aspect the disclosed embodiment is to a method further comprising validating before implementing at the monitoring device the identified likely meter read logic to extract information from the management information block at the monitored device.

In still another aspect the disclosed embodiment is to a method wherein validating comprises sending a test pattern to the monitored device and querying the management information block of the monitored device to read an increment count.

In still another aspect the disclosed embodiment is to a method further comprising receiving at the monitoring device at least one meter read logic from a central repository.

In still another aspect the disclosed embodiment is to a method further comprising selecting from a storage device at the monitoring device the identified likely meter read logic for the monitored device.

In still another aspect the disclosed embodiment is to a method wherein querying includes a network protocol.

In still another aspect the disclosed embodiment is to a method wherein querying is searching locations of the management information block to pull at least one specific value from a location in the management information block; wherein analyzing the ascertained information is comparing the at least one specific value to a predefined value.

In still another aspect the disclosed embodiment is to a method further comprising sending a range of test patterns to the monitored device if the querying does not produce pre-define meter data; wherein the test patterns causes the monitored device to write data on the management information block; querying the management information block to determine at least one location for the written data; modifying an existing meter read logic to incorporate the determined at least one location of the written data; and flagging the modified existing meter read logic to prevent implementation at the monitoring device until the flag is removed.

In still another aspect the disclosed embodiment is to a configurable device management system to extract meter data from a document processing system, the configurable device management system comprising a storage device comprising at least one meter read logic for reading meter data from the document processing system; a processor coupled to the storage device containing instructions operative on the processor for: querying the document processing system to ascertain information from a management information block; analyzing the ascertained information to identify a likely meter read logic for the document processing system; and implementing the identified likely meter read logic to extract information from the management information block at the document processing system.

In still another aspect the disclosed embodiment is to a computer-accessible medium having executable instructions to identify meter read logic to extract meter data from a managed printer system, the executable instructions capable of directing a processor to perform querying the managed printer system to determine a meter read logic supported by the managed printer system; selecting from a storage device the meter read logic that is supported by the managed printer system; validating the selected meter read logic by submitting a test pattern to the managed print system; and implementing the meter read logic if validated as being supported by the managed printer system.

The term "print engine" as used herein refers to a digital copier or printer, scanner, image printing machine, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like.

The term "management information base" (MIB) as used herein refers to a management information block, storage device, and can include any type of network management information and need not be a specific file, format, data structure or design. The MIB is at a minimum adapted to use Simple Network Management Protocol (SNMP).

The term "print media" generally refers to a usually flexible, sometimes curled, physical sheet of paper, plastic, or other suitable physical print media substrate for images, whether precut or web fed.

A "protocol" refers to a pre-defined method used by networked devices to used by networked devices to exchange information.

A "network management station" refers to a monitoring device or computer that is operated by a human user to monitoring the status of the devices on a computer network.

A "target device" is a managed node, such as a printer, computer, scanner, and the like, that is linked to a computer network.

A "network agent" is a software program running as a background process on a target device that receives and responds to requests for information about the target device.

A "network manager" is a software program available on a network management station that is capable of setting objects in a network agent running on a target device.

An "object" is an item of data that provides the status of a feature, function or other characteristic about an electronic device, with associated methods for modifying it.

An "object identifier (OID) is a sequence of non-negative integer values that signifies the path through a database structure that leads to a selected object.

An object is "available for export" when it is stored in the management information database for a target device with an associated object identifier and can be retrieved from the MIB when requested by a network manager. An object is "not available for export" when it relates to information about a device that can be obtained but it is not present in the management information database with an associated object identifier at the time it is requested by the network manager.

An "object identifier list" is a register of object identifiers. Accordingly, "available object list object" is an object that provides a register of object identifiers that are available for export from the management information database of a target device. An "available object list OID" is the object identifier associated with an available object list object.

An "add exportable object" is an object used to add a new object to a management information database. An "add exportable OID" is the object identifier associated with an add exportable object.

A "meter read logic" is an object or algorithm in a management information node that marshals measurements taken and held at a specific location of the target device MIB.

Figure 1:
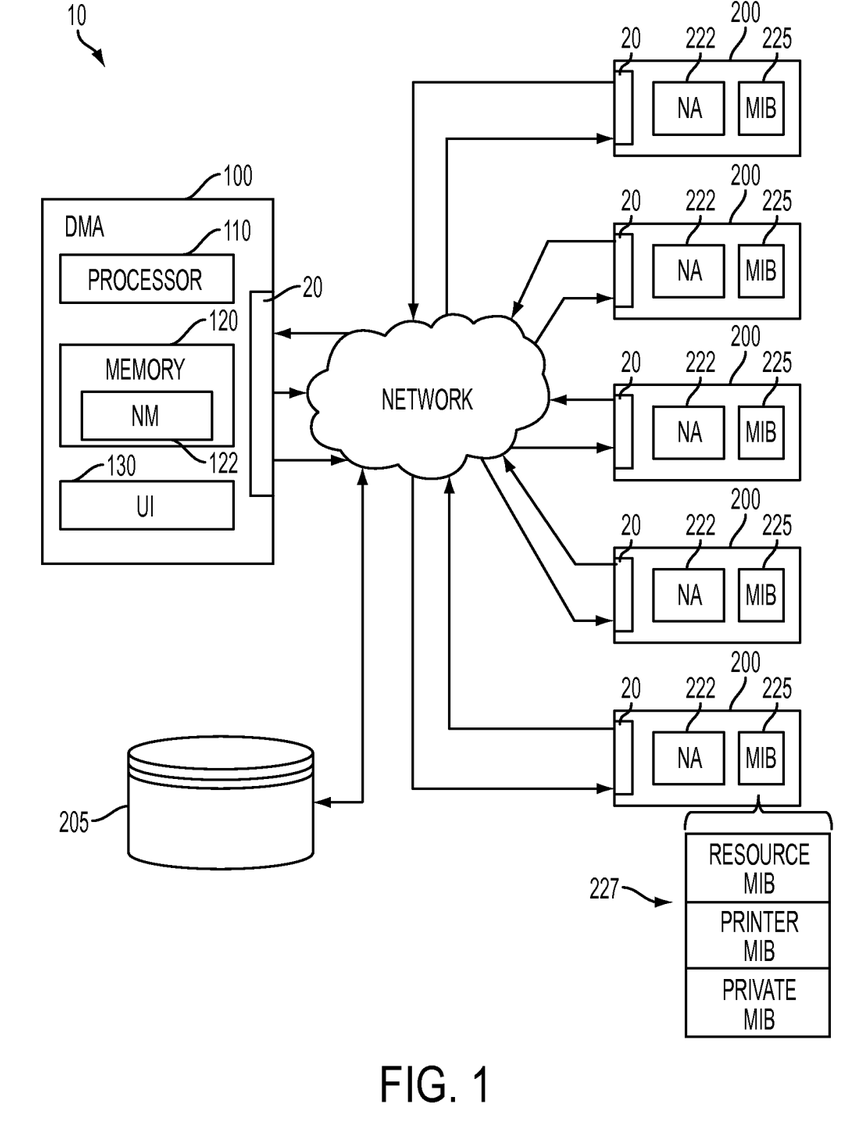
FIG. 1 is a general illustration of a computer network with several target devices linked for electronic communication in accordance to an embodiment.

FIG. 1 is a block diagram of a network 10 with a plurality of electronic devices that are linked for electronic communication. In the example shown, the devices that are linked to network 10 include a network management station or device management application (DMA) 100 and a plurality of target devices 200, which may be, for example, printers, plotters, digital printer, fax machines, computer workstations, file and print servers and/or networking resources and devices, such as, repeaters, switches, routers, routers hubs, concentrators, nodes, and the like. DMA 100 and each of the target devices 200 has a network interface 20 and is configured to communicate with network 10 using the Simple Network Management Protocol (SNMP). The device management application (DMA) 100 accesses the tethered device to obtain configuration information of the target devices 200. The configuration information returned to the DMA 100 includes, for example, an IP address of the target device 200, parameter names and associated values for each protocol, and vendor/manufacturer and model information of the target devices 200. Once the IP address is obtained, the DMA 100 sets the IP address, parameter names and associated values for each protocol, to create a software object for the device in the network agent 222. When the device software object is successfully created, the created object is used to obtain Vendor, Model, and Unique ID from the target devices 200 to be stored at DMA 100 or in database 205. Once the vendor, model information, and unique ID are obtained from the device software object, the DMA 100 updates the database with information received from the target devices 200. The information is used to monitor the target devices for alarm conditions, track depletion of resources, maintain a running account of resources such as print media and the like at the target device, and implement a billing strategy based on meter read logic for the device. A single meter read logic is ample for a homogenous network of devices, such an arrangement is tailored to fit all installations and does not allow for device differences in customer environments. The differences in devices at the customer environments causes the meter read logic at DMA 100 to work for some devices bit not for others. The differences in devices occur because meters are often maintained in different ways by different companies and within private MIBs. Without the ability to read the data in the MIB of the target device the DMA is deprived of data needed to implement a pricing strategy. Database 205 can be preloaded with all known meter read logic and made available as a service to the DMA for utilization with the target device.

Generally, networks manage the transmission of data among the devices using a network protocol. While network communications take place in many ways, many networks use one of a few widely known standards that are known to facilitate efficient communication among unrelated devices. For example, networks throughout Europe commonly operate under the Common Management Information Protocol (CMIP), while use of the Simple Network Management Protocol (SNMP) is more common in the United States. The capabilities of a given network will typically be limited by the functionality that is supported by its communication protocol.

SNMP is a network communication standard that provides a data transmission protocol, a structure for an object-oriented management information database (MIB) and a set of well defined data objects. SNMP objects define the status and characteristics for a selected network device. They are identified by an object identifier (OID) that defines the path through the database structure that leads to the object. Each target device on the network runs a network agent that maintains a MIB of objects corresponding to discoverable information supported by that device. Further, the MIB for each device is typically configured solely by the device manufacturer. Thus, while it may be possible to discover a significant amount of information about a device, the network manager cannot obtain any information that does not correspond to an object that the manufacturer has included in its MIB.

To obtain device information, the network manager typically identifies the network agent running on the target device, determines the type of information maintained in the device and sends the network agent the OID for the desired information with an instruction to either get or modify the value of the object. The network agent responds by accessing its MIB and retrieving/modifying the value of the object corresponding to OID or if the OID is not recognized, sending the network manager an error message indicating that the requested information is non-discoverable.

To identify the all of the discoverable information for a target device, a network manager would have to walk through the objects in the MIB one-by-one using a string of "get-next" requests. More specifically, the network manager could send the network agent a "get" request that includes the first OID, and then send repeated "get-next" requests to obtain all of the discoverable information for the target device.

While present systems and methods are illustrated herein using SNMP, it is understood, that other network protocols may be used and that systems and methods that are described are not limited use with to network systems and that in fact, they may be applied to any type of device to be managed.

DMA 100 includes a processor 110 that is capable of executing one or more software programs that are stored in memory 120. One such program is a client application known as a network manager (NM) 122, which manages objects 123 that are maintained in the MIBs 225 of networked target devices 200. In the example shown, DMA 100 also has a user interface (UI) 130 where data can be entered by and displayed to a user at DMA 100.

Figure 2:
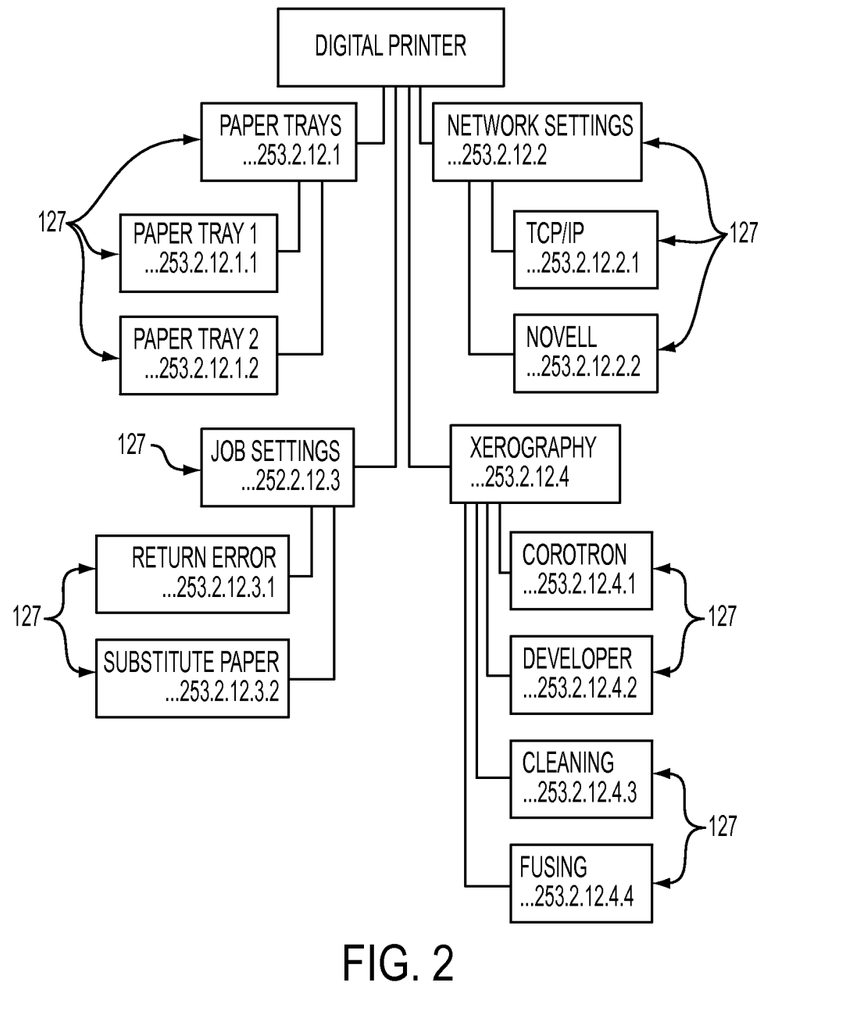
FIG. 2 shows the structure of an MIB of a network managed device using database objects in accordance to an embodiment.

Each target device 200 on the network runs a network agent (NA) 222 that maintains an object oriented management information base (MIB) 225 of objects that correspond to discoverable information supported by that target device 200. NM 122 monitors and manages network devices by sending SNMP requests, each of which includes one or more OIDs 127, to the NA 222 running on target devices 200. NA 222 responds by accessing the associated MIB 225 and reading or modifying the object 123 corresponding to OID 127 as shown in FIG. 2. Database 205 provides storage services to devices that are linked for electronic communication. In particular database 205 is a hosted repository for device management applications to pull updated meter read logic. In this embodiment, the SNMP agent 222 manages the target device resource MIB, a printer MIB, and among vendor-specific private MIBs which is an MIB object relating to the printer as structured by the manufacturer or vendor. For the purpose of this disclosure an MIB can refer to one MIB which can be partitioned into distinct sections or more than one MIB 227 form of discrete elements. The printer MIB is an object for providing information such as parameters and metering information that relate to the printer. The details of the structure of the object are stipulated in RFC-1213, RFC-1759, or RFC 3805 Printer MIB. The private MIB includes content which, the manufacturer of the printer itself assigns to the NIC. The host resource MIB provides information concerning resources of a host computer.

The DMA 100 can offer services such as Automated Buffing, Automated Supplies Replenishment, and Remote Monitoring. Automated Billing is preferably a subscribed service that on demand or automatically reports the required billing meter to the supplier via the Device-centric services infrastructure. Automated Supplies Replenishment is service that tracks toner usage, area coverage, and toner bottle change events in order to supply the supplier with the information necessary to ensure the timely and accurate delivery of meter supplies to the user's site without human intervention. Remote monitoring is preferably a service that periodically gathers up a configurable set of data found in the system, models it in a standard fashion, and publishes it back to the supplier. Examples of the type of data found in this service include billing meters, IOT faults, media path jams, image area coverage, media usage (weight, size, and type), feature usage, toner status, simplex/duplex quantities, media tray usage, reduction and enlargement, copy modes, and High-Frequency Service Items status.

FIG. 2 shows the structure of a MIB of a network managed device using database objects in accordance to an embodiment. The structure of an object or OID 127 will typically begin with a series of numbers that identifies the type of device being managed and its manufacturer. For example, a typical OID 127 begins with several standard SNMP identifiers that are followed by a series of digits that identifies the manufacturer of the respective target device 200. In the case of a digital printer, OID 127 will often include identifiers that are used to access objects that relate to paper trays, staplers and other components, xerographic and other subsystems, network settings, job settings, and similar devices. In the example shown, all the OIDs 127 for the selected printer begin with the same series of numbers (e.g., 1.3.6.1.4.1.253.2.12) and different printer functions are addressed by the remaining identifiers. More specifically, all objects relating to printer network settings end in "1.X," with TCP/IP settings ending in "1.1" and Novell settings end in "1.2," while all objects relating to paper trays end in "2.X," all objects relating to job settings end in "3.X" and all objects relating to the components of the Xerographic subsystem end in "4.X." showing the of the structure of this MIB.

Figure 3:
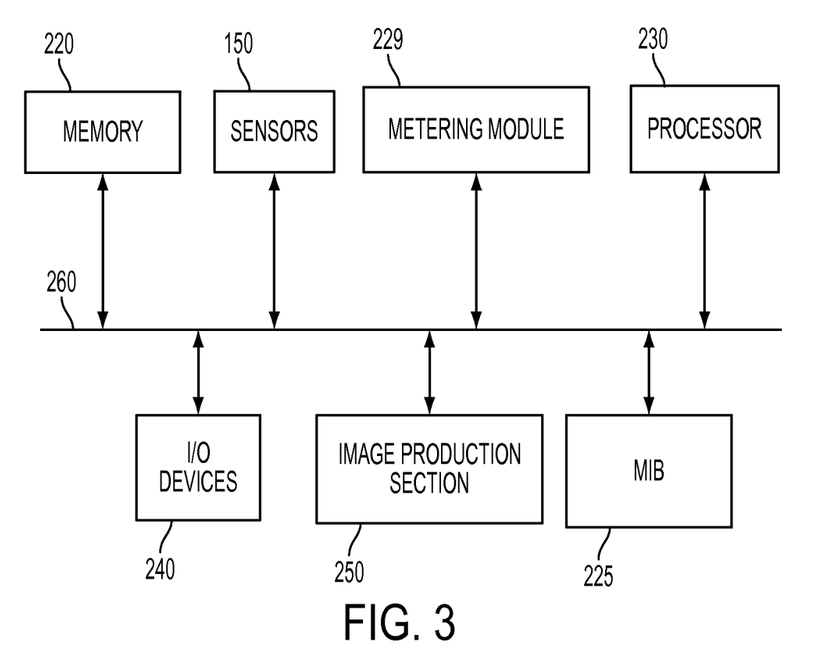
FIG. 3 illustrates a block diagram of a controller for a printer system in accordance to an embodiment.

FIG. 3 illustrates a block diagram of a controller for a printer system in accordance to an embodiment. The controller may be embodied within devices such as a desktop computer, a laptop computer, or another type of computing or electronic device, or the like. The controller may include a memory 220, a processor 230, input/output devices 240, image reproduction section 250 and a bus 260. The bus 260 may permit communication and transfer of signals among the components of the computing device such as processor 230.

Processor 230 may include at least one conventional processor or microprocessor that interprets and executes instructions. The processor 230 may be a general purpose processor or a special purpose integrated circuit, such as an ASIC, and may include more than one processor section. Additionally, the system 200 may include a plurality of processors 230.

Memory 220 may be a random access memory (RAM) or another type of dynamic storage device that stores information and instructions for execution by processor 230. Memory 220 may also include a read-only memory (ROM) which may include a conventional ROM device or another type of static storage device that stores static information and instructions for processor 230. The memory 220 may be any memory device that stores data for use by the controller or devices coupled to network 10. The controller with the appropriate programming or instruction could act as the device management application 100.

Input/output devices 240 (I/O devices) may include one or more conventional input mechanisms that permit a user to input information to the controller, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. Image production section 250, which includes hardware by which image signals are used to create a desired image for processing at the target device 200.

Figure 4:
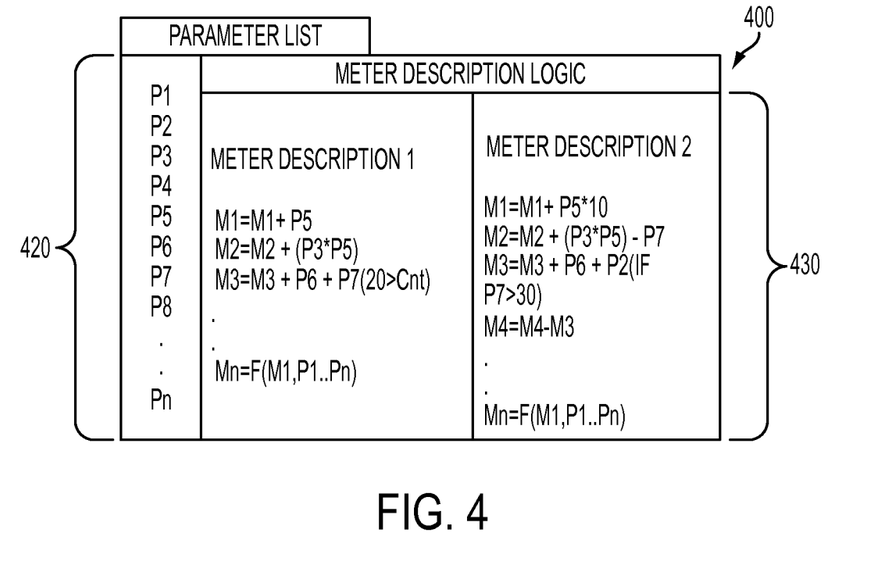
FIG. 4 is an illustration of a meter read logic operative within the management information base (MIB) of a document processing system/printer system to follow a particular billing strategy in accordance to an embodiment.

The sensors 150 can be real sensors distributed throughout the print engine and/or virtual sensors, distributed throughout software modules of the print engine and/or controller. The value produced by the sensors are used as parameters 420 to derive meter values that form part of the meter read logic usable for different billing formulations and to monitor the condition of the printer system.

The information from sensors 150 is delivered to the metering module to meter uses of resources that is useful for replenishment and for billing the user of the resources at the printing system.

The controller may perform functions in response to processor 230 by executing sequences of instructions or instruction sets contained in a computer-readable medium, such as, for example, memory 220. Such instructions may be read into memory 220 from another computer-readable medium, such as a storage device, or from a separate device via a communication interface, or may be downloaded from an external source such as the Internet. The controller may be a stand-alone system, such as a personal computer, or may be connected to a network such as an intranet, the Internet, and the like.

The memory 220 may store instructions that may be executed by the processor to perform various functions. For example, the memory may store instructions to allow the controller to perform various printing functions in association with a particular printing engine connected to the controller.

FIG. 4 is an illustration of a meter read logic 400 operative within the management information base (MIB) of a document processing system/printer system to follow a particular billing strategy in accordance to an embodiment. Typically, a meter read logic is delivered to the metering module when a document processing system is shipped from the factory. Alternatively, a meter read logic is saved to a metering module through direct upload or updated remotely through network 10.

The parameter list 420 is arbitrarily long and contains parameters, for example, $P_1$ through $P_n$. The parameter list 420 informs the metering module 229 of the billable events or activities a managed device such as a printing system is capable of reporting. Furthermore, the parameter list 420 explains the format in which the device will communicate the parameters to the metering module. For example, the parameter list 420 includes an impression flag. Alternatively or additionally, the parameter list may include a count of total impressions made parameter. An impressions flag is used to indicate that the target device 200 has issued commands to the print engine causing the print engine to print an image on, for example, one side of a piece of paper (an impression on the other side of the piece of paper counting as a second impression). A count of total impressions made is, for example, a grand total of impressions made during a particular print job.

Other parameters types that may be included in a parameter list 420 include a set completion flag, a set count, a diagnostic impression flag, a media descriptor, a highlight color flag and a full color flag. A set is some logical grouping of document pages. For example, a set is a collection of document pages on which a finishing step is performed. For instance, a set is a group of pages that are stapled together. Alternatively, a set is, for example, a collection of stapled documents that are shrink-wrapped together. A set completion flag indicates the completion of a set. Alternatively, a set completion flag indicates the completion of a number of sets. For example, a set completion flag may indicate the completion of ten or one hundred sets. A set count is, for example a running total of completed sets. Alternatively a set count is a grand total of sets completed in a job. A diagnostic impression flag indicates, for example, that an impression is a diagnostic impression, ordered, for example, by a service technician. In some cases, customers are not charged for diagnostic impressions. A diagnostic set flag may be used to indicate that a set is being run for diagnostic purposes. A media descriptor indicates, for example, the kind of media an impression is made on. For example, a media descriptor indicates that large paper is used or that a sheet of velum is marked or that regular paper is being printed on. A highlight color flag indicates when highlight color is included in an impression. A full color flag indicates when an impression includes full color markings. This list is exemplary only, and not intended to be limiting. An important aspect of the metering module 229 is readily adapted to record and use information regarding billable aspects of document processing that have not as yet been conceived. Further the metering module 229 is implemented as virtual meters comprising memory locations that are written and read from as required from the management information base (MIB) 225 at the respective target device 200.

The meter description logic 430 portion of the meter read logic 400 is also arbitrarily long and contains, for example, meter descriptions $M_1$ through $M_n$. In general, the meter descriptions are expressed in the form of functions f( ) of the parameters $P_t$ through $P_n$. The meter descriptions logic 430 explain what the metering module 229 is to do with parameter or aspect information passed to it. For example, the metering module 229 is instructed to maintain a first meter $M_1$. An equation or function describes the operation of the first meter. For, example expression $(M_t=M_1+P_5)$ describes the function of the first meter $M_1$. For instance, parameter $P_5$ is an impression count. Parameter $P_5$ reports the number of impressions made in a set upon the completion of the set. Therefore, when updated, the first meter $M_1$ records a total number of impressions made. The updated value of the first meter $M_t$ is the old value contained in the first meter $M_1$ plus the number of impressions $P_5$ made in the set. Other metering rules are shown and can be set based on different billing strategies that are well-known to those ordinarily skilled in the art, and Details can be found, for example, in U.S. Patent Application 2002/0087470 (Hayes et al) and U.S. Pat. No. 7,726,556 (Beabes et al) and U.S. Pat. No. 7,644,145 (Rockwell), the complete disclosures of which are incorporated herein by reference. Preferably, the meters described in the meter description logic 430 are implemented as virtual meters comprising memory locations that are written and read from as required from the management information base (MIB) 225 at the respective target device 200.

The meter description logic 430 can be customization to include, for example, the data that is sent as part of a remote monitoring service, the time of day or frequency at which meter reads are sent to the supplier. The exact configuration parameters can be specific to the service being offered. Policy Setters can define uniform service versions or parameter settings based on Internal or External Customer requirements through use of rules. This uniformity may be defined at a user level, a site level, a machine category, or any other relevant grouping.

Figure 5:
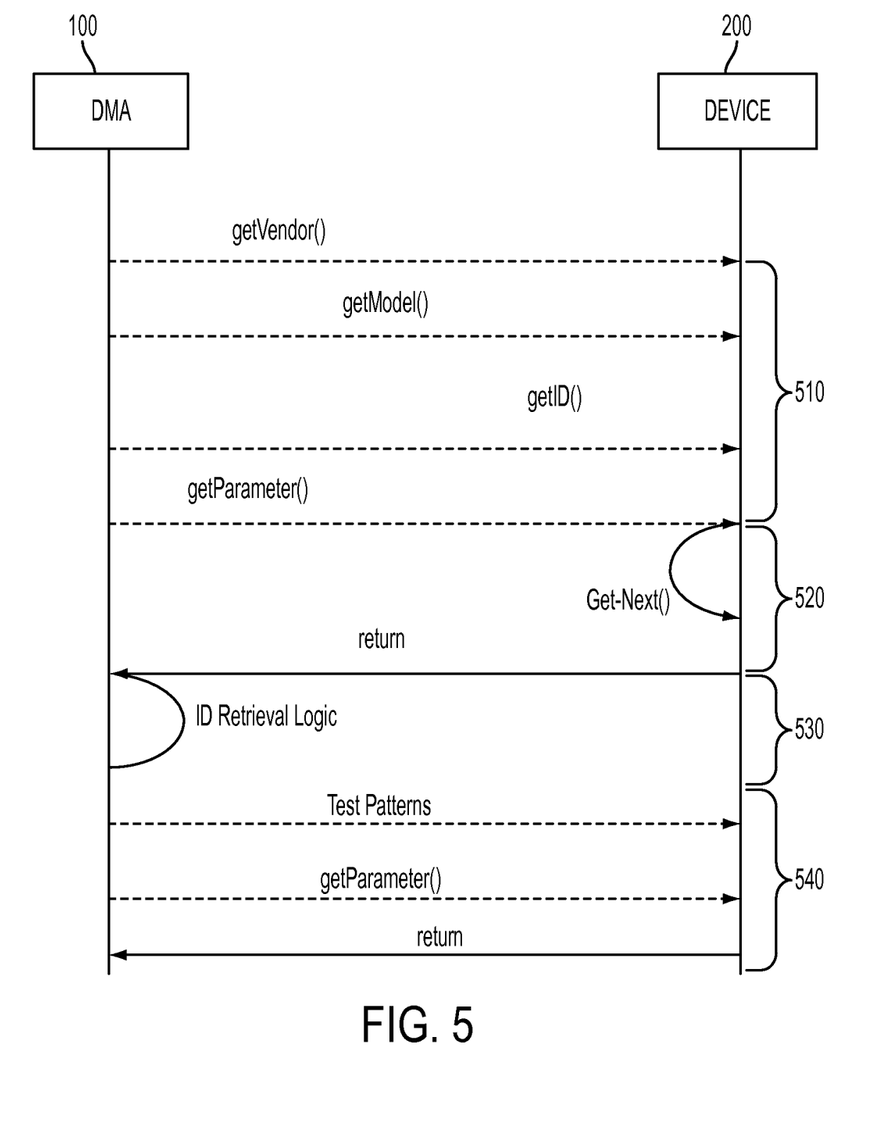
FIG. 5 shows query and validation function sequences between the device management application and the targeted device in accordance to an embodiment.

FIG. 5 shows query and validation function sequences between the device management application and the targeted device in accordance to an embodiment. Communication between the devices uses one or a combination of protocols to acquire information about the target device. The SNMP protocol is selected to access a monitored device, and device information that is configured to be efficiently retrieved using the SNMP protocol. The HTTP and FTP protocols are selected to obtain information that was incapable of efficient retrieval using the SNMP protocol if the device supports the additional protocols. The selection of protocols is performed by a protocol manager in conjunction with support information stored in a database of the device management application. Example of queries using the SNMP protocol are getUniqueID( ), getVendor( ), getModel( ) and other function that are well known to those in the art. The getUniqueID( ) which returns the unique ID of the device. The getModel( ) function gets the model of the device. The getVendor( ) function returns the vendor name. If the device is not supported by the system, but it can be accessed through one of the protocols, GENERIC can be an argument. The getParameter function gets parameter information and when coupled with the getNext will retrieve P1 through Pn. The obtainEventStatus( ) function obtains event status information.

The device management application (DMA) 100 obtains information about a monitored device 200 and uses an IP address assigned to the monitored device to communicate with the monitored device. The DMA accesses Device object identifier (OID) to obtain configuration information of the monitored device. The sequence of interaction between DMA 100 and device 200 is querying 510 a monitored device to ascertain information 520 from a management information block at the monitored device, analyzing 530 the ascertained information to identify a likely meter read logic for the monitored device, and validating 540 before implementing at the monitoring device the identified likely meter read logic to extract information from the management information block at the monitored device.

Figure 6:
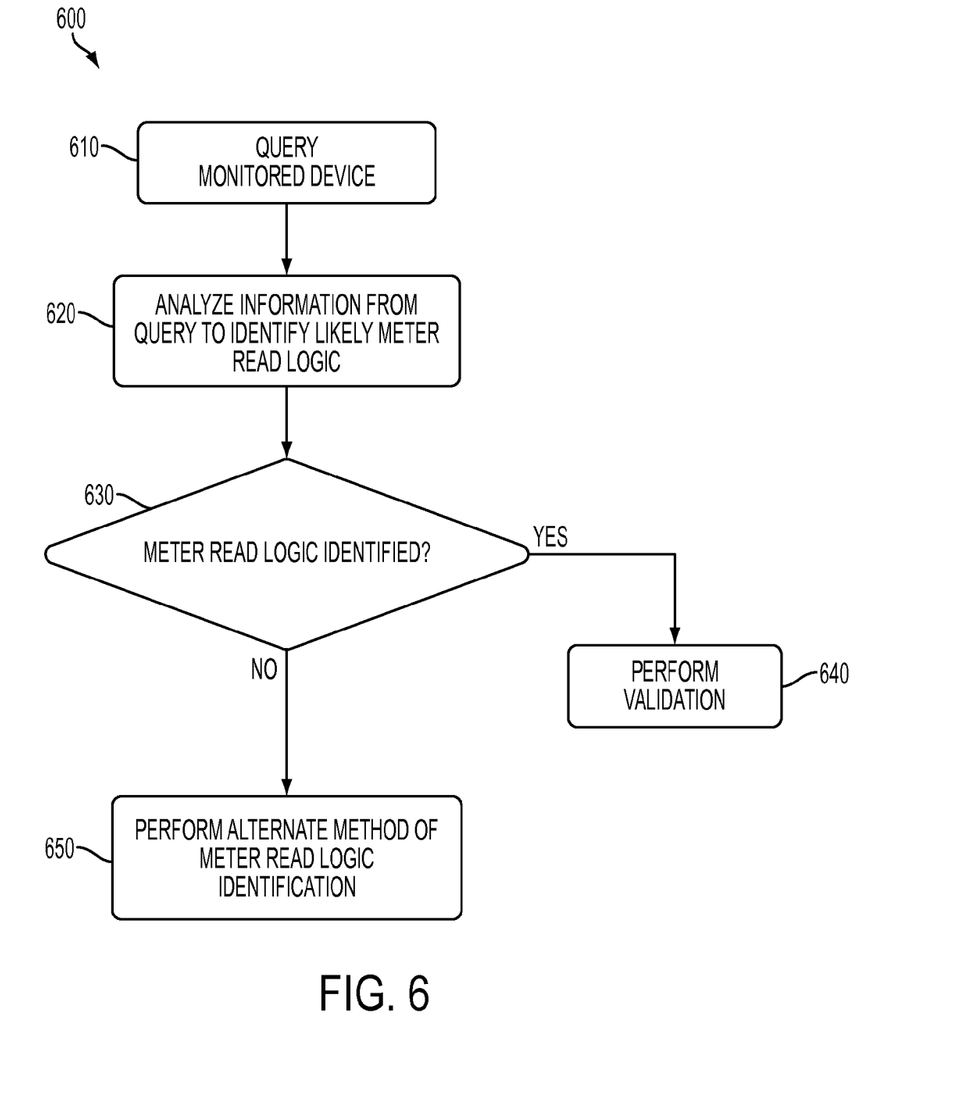
FIG. 6 is a flow chart of a method to identify meter read logic for a monitored device in accordance to an embodiment.

FIG. 6 is a flow chart of a method 600 to identify meter read logic for a monitored device in accordance to an embodiment. Method 600 can be invoked when a new device is added to a customer network by the name of "Printer_At_Customer_Network_A". This printer is a new and unknown device to the device management application 100. The method of reading meters is unknown for this device. By queries of the device MIBs, the management application is able to establish that "Method X" is the likely candidate for meter read of device parameters and metered data. "Method X" was one of many methods pushed to the device via an automatic update process from a hosted repository like database 205. Method 600 begins with querying 610 the monitored device to ascertain information from a management information base (MIB)

at the monitored device. As noted above concerning sequence 510 through SNMP functions the DMA can discover the identification, vendor, and model of the target device. The query 610 is able to return the location in the MIB 225 where the managed device saved/wrote the meter data (M1 ... Mn) and parameters (P1 ... Pn) after processing of a print request by the device. The returned information from the query request is analyzed at action 620 to determine a likely meter read logic. The information from the query is analyzed by comparing the location of the meter data with the expected location of known methods for gathering meter data for the particular device. The query returns information as to the model and vendor of the device, we can select a likely meter read logic since meters are often maintained in the same way by companies and within private MIBs. The device management application is able to establish that "Method X" is the likely candidate for device meter reads. Control is then passed action 630 for further processing. In action 630, a decision is made based on whether a likely meter read logic has been identified in action 620 or analyzes step. If "YES" then control passes to action 640 where a validation is performed on the likely/identified meter read logic. If "NO" then control is passed to action 650 where alternate method of meter read logic identification is performed.

Figure 7:
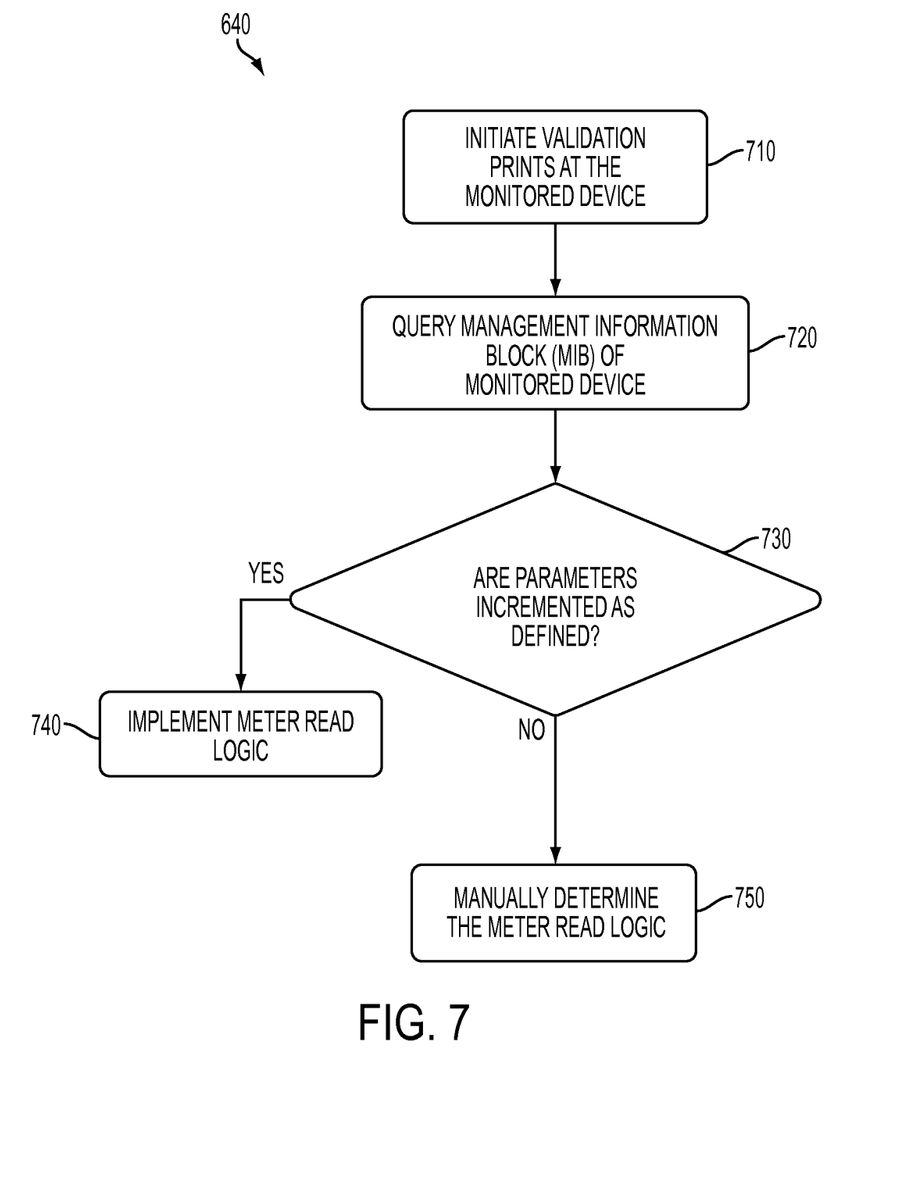
FIG. 7 is a flow chart of a method to validate the identified meter read logic of FIG. 6 in accordance to an embodiment.

FIG. 7 is a flow chart of a method to validate 640 the identified meter read logic of FIG. 6 in accordance to an embodiment. The device management application 100 initiates, at a predefined acceptable time, a small number of validation prints 710 which are used for confirmation of the method chosen. The device queries 720 the meters again and finds they have in fact incremented 730 as defined. The method for meter read logic will now be implemented 740 for that device. If validation is not possible then a manual method 750 for determining meter read logic is recommended.

Figure 8:
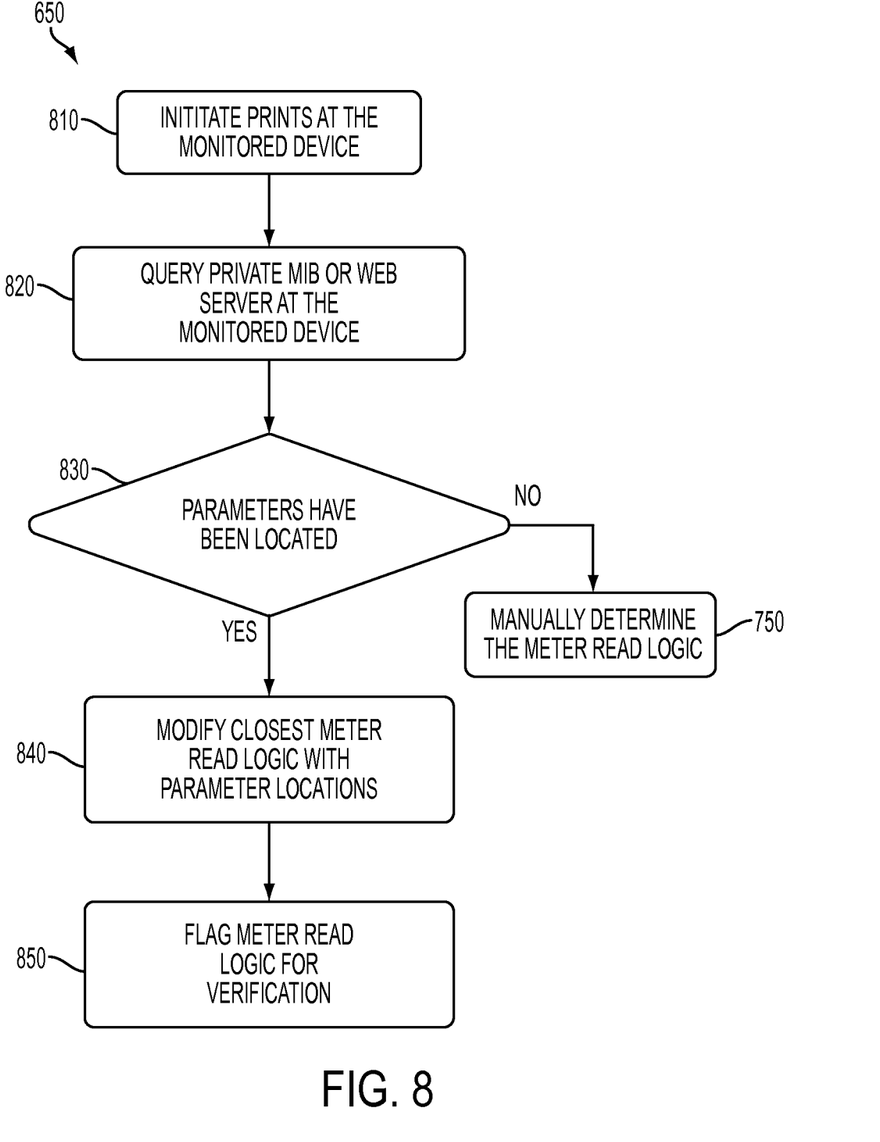
FIG. 8 is a flow chart of an alternative method to identify meter read logic for a monitored device in accordance to an embodiment.

FIG. 8 is a flow chart of an alternative method to identify meter read logic for a monitored device in accordance to an embodiment. A new device is added to a customer network by the name of "Printer_At_Customer_Network_B". This printer is a new and unknown device to the device management application 100. The method of reading meters is unknown for this device. The device management application 100 will go though each one of its known implementations of retrieving meters from the device checking the potential locations at the MIB against the known changes made by sending test jobs to the device. If none of the known methods is found to support the device the management application will submit a wider range of test jobs 810 and search the device's entire MIB for the expected changes 820. At the same time the management application 100 will search the devices entire embedded web site to find where it reports "Page Count" 820. It will compare the potential MIB values to the values pulled from the web UI of the printer to verify that the location in the MIB has the correct information 830. Once the management application has found the correct locations for the meter reads it will update its internal system with the new meter read logic (algorithm) 840 of retrieving meter reads to be checked the next time a device is found. Once a candidate location is identified, a confirmation test job is submitted and the MIB location for meter reads is verified following method 640 in FIG. 7. It will also flag the meter reads as unconfirmed until the new algorithm has been approved 850. However, if method 650 does not find likely meter read logic it will flagged for manually determining 750.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to identify meter read logic for monitored devices comprising:
   querying a monitored device to ascertain information from a management information base at the monitored device;
   analyzing the ascertained information to identify a likely meter read logic for the monitored device;
   implementing at a monitoring device the identified likely meter read logic to extract information from the management information base at the monitored device;
   sending a range of test patterns to the monitored device if the querying does not produce predefine meter data wherein the test patterns causes the monitored device to write data on the management information base;
   querying the management information base to determine at least one location for the written data;
   modifying an existing meter read logic to incorporate the determined at least one location of the written data; and
   flagging the modified existing meter read logic to prevent implementation at the monitoring device until the flag is removed.

2. The method according to claim 1, further comprising:
   validating before implementing at the monitoring device the identified likely meter read logic to extract information from the management information base at the monitored device.

3. The method according to claim 2, wherein validating comprises sending a test pattern to the monitored device and querying the management information base of the monitored device to read an increment count.

4. The method according to claim 2, further comprising:
receiving at the monitoring device at least one meter read logic from a central repository.

5. The method according to claim 4, further comprising:
selecting from a storage device at the monitoring device the identified likely meter read logic for the monitored device.

6. The method according to claim 5, wherein querying includes a network protocol.

7. The method according to claim 6, wherein querying is searching locations of the management information base to pull at least one specific value from a location in the management information base;
wherein analyzing the ascertained information is comparing the at least one specific value to a predefined value.

8. A configurable device management system to extract meter data from a document processing system, the configurable device management system comprising:
a storage device comprising at least one meter read logic for reading meter data from the document processing system;
a processor coupled to the storage device containing instructions operative on the processor for:
querying the document processing system to ascertain information from a management information base;
analyzing the ascertained information to identify a likely meter read logic for the document processing system;
implementing the identified likely meter read logic to extract information from the management information base at the document processing system;
sending a range of test patterns to the document processing system if the querying does not produce predefine meter data wherein the test patterns causes the document processing system to write data on the management information base;
querying the management information base to determine at least one location for the written data;
modifying an existing meter read logic to incorporate the determined at least one location of the written data; and
flagging the modified existing meter read logic to prevent implementation at the document processing system until the flag is removed.

9. The configurable device management system according to claim 8, further comprising:
validating before implementing the identified likely meter read logic to extract information from the management information base.

10. The configurable device management system according to claim 9, wherein validating comprises sending a test pattern to the document processing system and querying the management information base to read an increment count.

11. The configurable device management system according to claim 9, wherein the at least one meter read logic is received from a central repository.

12. The configurable device management system according to claim 11, further comprising:
selecting from the storage device the identified likely meter read logic for the document processing system.

13. The configurable device management system according to claim 12, wherein querying includes a network protocol.

14. The configurable device management system according to claim 13, wherein querying is searching locations of the management information base to pull at least one specific value from a location in the management information base;
wherein analyzing the ascertained information is comparing the at least one specific value to a predefined value.

15. A non-transitory computer-accessible medium having executable instructions to identify meter read logic to extract meter data from a managed printer system, the executable instructions capable of directing a processor to perform:
querying the managed printer system to determine a meter read logic supported by the managed printer system;
selecting from a storage device the meter read logic that is supported by the managed printer system;
validating the selected meter read logic by submitting a test pattern to the managed print system; and
implementing the meter read logic if validated as being supported by the managed printer system; and
wherein validating comprises sending test print jobs to the managed printer system and querying a management information base of the managed printer system to read an increment count.

16. The non-transitory computer-accessible medium according to claim 15, wherein the storage device
receives at least one meter read logic from a central repository.

17. The non-transitory computer-accessible medium according to claim 15, wherein querying includes a network protocol.

18. The non-transitory computer-accessible medium according to claim 15, wherein querying is searching locations of the management information base to pull at least one specific value from a location in the management information base;
wherein selecting the meter read logic comprises comparing the at least one specific value to a predefined value.

19. The non-transitory computer-accessible medium according to claim 15, further comprising:
sending a range of test patterns to the managed printer system if the querying does not produce predefine meter data; wherein the test patterns causes the managed printer system to write data on the management information base;
querying the management information base to determine at least one location for the written data;
modifying an existing meter read logic to incorporate the determined at least one location of the written data; and
flagging the modified existing meter read logic to prevent implementation at the managed printer system until the flag is removed.

* * * * *